United States Patent [19]

Kalomiris

[11] Patent Number: 4,875,753
[45] Date of Patent: Oct. 24, 1989

[54] FIBER OPTIC CONNECTORS

[76] Inventor: Vasilios E. Kalomiris, 20 Line Rd., Holmdel, N.J. 07733

[21] Appl. No.: 880,511

[22] Filed: Jul. 2, 1986

[51] Int. Cl.[4] .............................................. G02B 6/36
[52] U.S. Cl. ................................................ 350/96.20
[58] Field of Search ................. 350/96.20, 96.21, 96.22

[56] References Cited

U.S. PATENT DOCUMENTS

| | | | |
|---|---|---|---|
| 3,933,409 | 1/1976 | Kloots | 350/96.20 |
| 4,155,624 | 5/1979 | Logan et al. | 350/96.21 |
| 4,529,263 | 7/1985 | Moriyama et al. | 350/96.22 X |

Primary Examiner—John D. Lee
Attorney, Agent, or Firm—Michael J. Zelenka; John K. Mullarney

[57] ABSTRACT

This disclosure relates to fiber optic connector keying arrangements which prevent the unintended mixing of traffic when a plurality of similar fiber optic cables are to be interconnected with electronic equipment handling traffic of various types and classifications. The connector assembly at each end of a fiber optic cable comprises a hermaphrodite connector end plug (i.e., a keying insert) that has an end face configuration which is unique to that particular cable. The equipment (bulkhead) connector assembly to be connected to a given cable also includes a keying insert end plug which is identical to that of the cable. Thus, a given cable connector can be connected or coupled to, and only to, a similarly configured, bulkhead, connector assembly. Each cable comprises at each end a unique, keying insert, end plug and, therefore, each cable can be connected to only one similarly configured, bulkhead connector; and, undesirable connections, and consequent traffic mixing, are thereby precluded. Each cable and bulkhead connector assembly has a cover with a unique insert that exactly matches and precisely mates with its intended connector assembly.

12 Claims, 7 Drawing Sheets

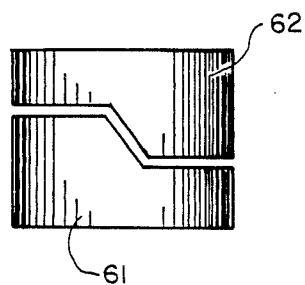
FIG. 6
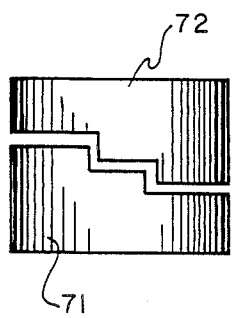
FIG. 7
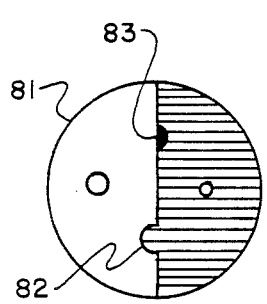 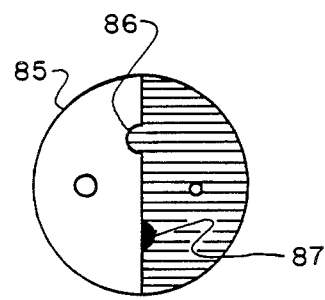
FIG. 8A    FIG. 8B

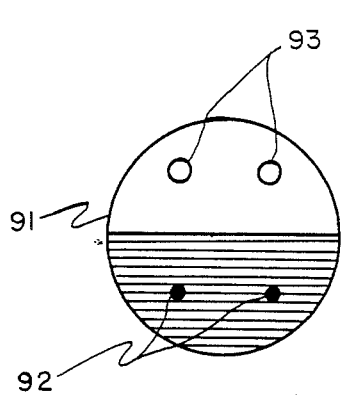
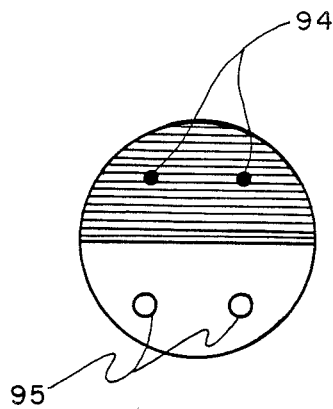
FIG. 9A      FIG. 9B
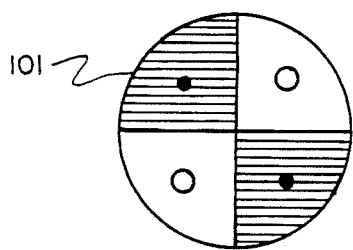
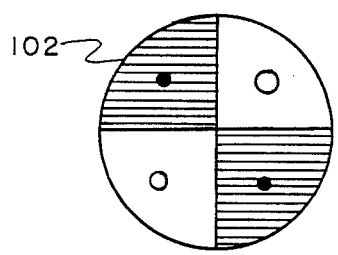
FIG. 10A      FIG. 10B
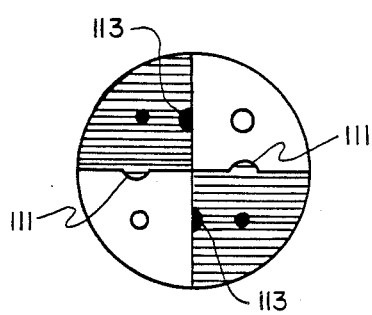
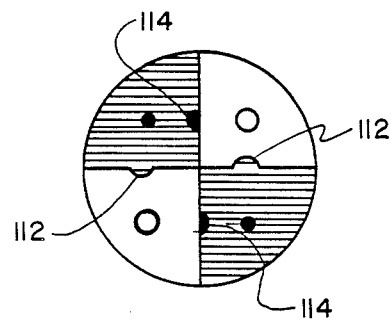
FIG. 11A      FIG. 11B

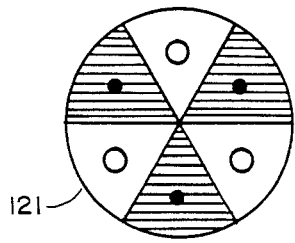
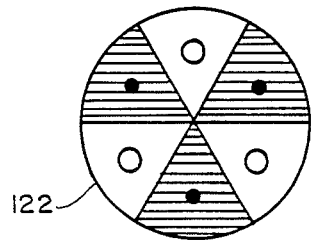
*FIG. 12A*                *FIG. 12B*
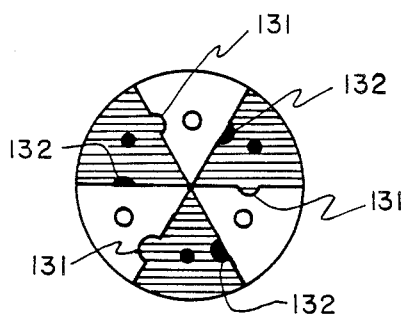
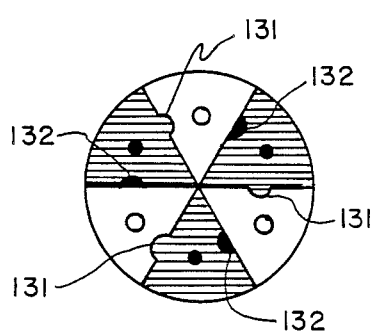
*FIG. 13A*                *FIG. 13B*

FIBER OPTIC CONNECTORS

The invention described herein may be manufactured, used and licensed by or for the Government for governmental purposes without the payment to me of any royalties thereon.

TECHNICAL FIELD

The present invention relates to fiber optic connector assemblies and, more particularly, to fiber optic connector keying arrangements which preclude undesirable optical fiber cable connections to equipment having multiple input and/or output connection ports

BACKGROUND OF THE INVENTION

For purpose of explanation assume that electronic equipment (for radar, communications, or some other purpose) is located in an advanced field position and messages between the same and a remote area(s) are to be carried via fiber optic cables. with such equipment in position, a service person will transport the (multiple) cables to the equipment for connection thereto. Using the common, commercially available, connector assemblies (to be described hereinafter) it will be evident to those in the art that any given fiber optic cable might be connected to any equipment output port connector (i.e. a bulkhead connector). This, of course, can cause very serious problems when the fiber optic cables must be interconnected with equipment carrying traffic of various types and classifications (e.g., classified and unclassified messages).

An ovious solution to the problem is, of course, to color code the cable connector assemblies and the equipment or bulkhead connector assemblies which are to be interconnected. Unfortunately, color coding is useless when the fiber cable-to-equipment connections must be made in the dark - as may be necessary during military operations.

SUMMARY OF THE INVENTION

It is a primary object of the present invention to prevent any possible mixing of traffic in situations where essentially the same fiber optic cables are used for inter connection with equipment handling traffic of various types and classifications.

A related object of the invention is to preclude undesirable connections when a plurality of fiber optic cables are to be connected to electronic equipment.

A still further object of the invention is to assure the "lock-out" of undesirable cable connections in the most cost effective manner possible.

These and other objects are achieved in accordance with the invention wherein the connector assembly at each end of a fiber optic cable comprises a hermaphrodite connector end plug (i.e., a keying insert) that has an end face configuration which is unique to that particular cable. The equipment (bulkhead) connector assembly to be connected to a given cable also includes a keying insert end plug which is identical to that of the cable. Since the bulkhead connector assembly and the connector assembly at each end of the fiber optic cable comprise the same unique, hermaphroditic, keying insert, either end of the cable can be readily connected to the similarly configured connector assembly of the electronic equipment. The connector assemblies of the other fiber optic cables and the bulkhead connector assemblies to be respectively interconnected with the cables are similarly unique. That is, each cable comprises at each end a unique, hermaphrodite, connector keying inset which is different from those of the other fiber optic cables and, therefore, a given cable can be connected to one, and only one, similarly configured, bulkhead connector assembly. Accordingly, undesirable fiber optic cable connections are precluded.

In accordance with a feature of the invention a connector cap or cover is provided for each connector assembly (cable and bulkhead) and the cover for each has a unique end face configuration which is identical to, and therefore matches with, that of the keying insert of the connector it is intended to cover. As will be explained in detail hereinafter the connector covers facilitate the cable-to-equipment interconnection operation.

A further advantageous feature is the cost effectiveness of the invention since only the keying insert (i.e., connector end plug) is different and the connector assembly can be the same in all other respects.

BRIEF DESCRIPTION OF THE DRAWINGS

The invention will be more fully appreciated from the following detailed description when the same is considered in connection with the accompanying drawings in which:

FIGS. 6, 7, 8A and 8B show keying insert end plugs having other and different end face configurations;

FIGS. 9A, 9B, 10A, 10B, 11A, 11B illustrate unique keying insert end plugs for four-fiber optical connectors; and FIGS. 12A, 12B, 13A, 13B show unique, keying insert end plugs for six-fiber optical connectors.

DETAILED DESCRIPTION

Figure 1:
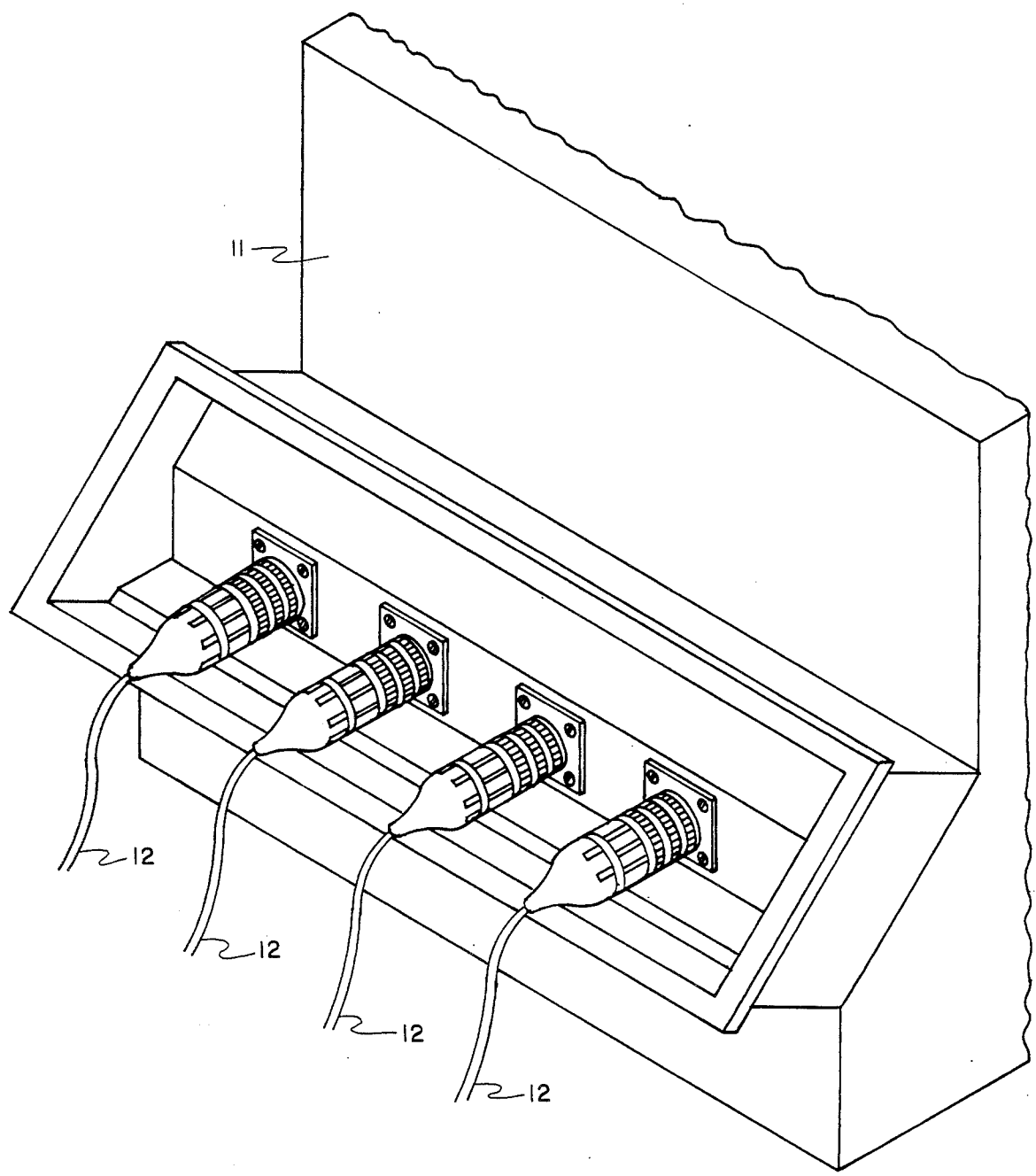
FIG. 1 is a simplified showing of a block of electronic equipment (e.g., for communications) having a plurality of fiber optic cables connected thereto.
Figure 2:
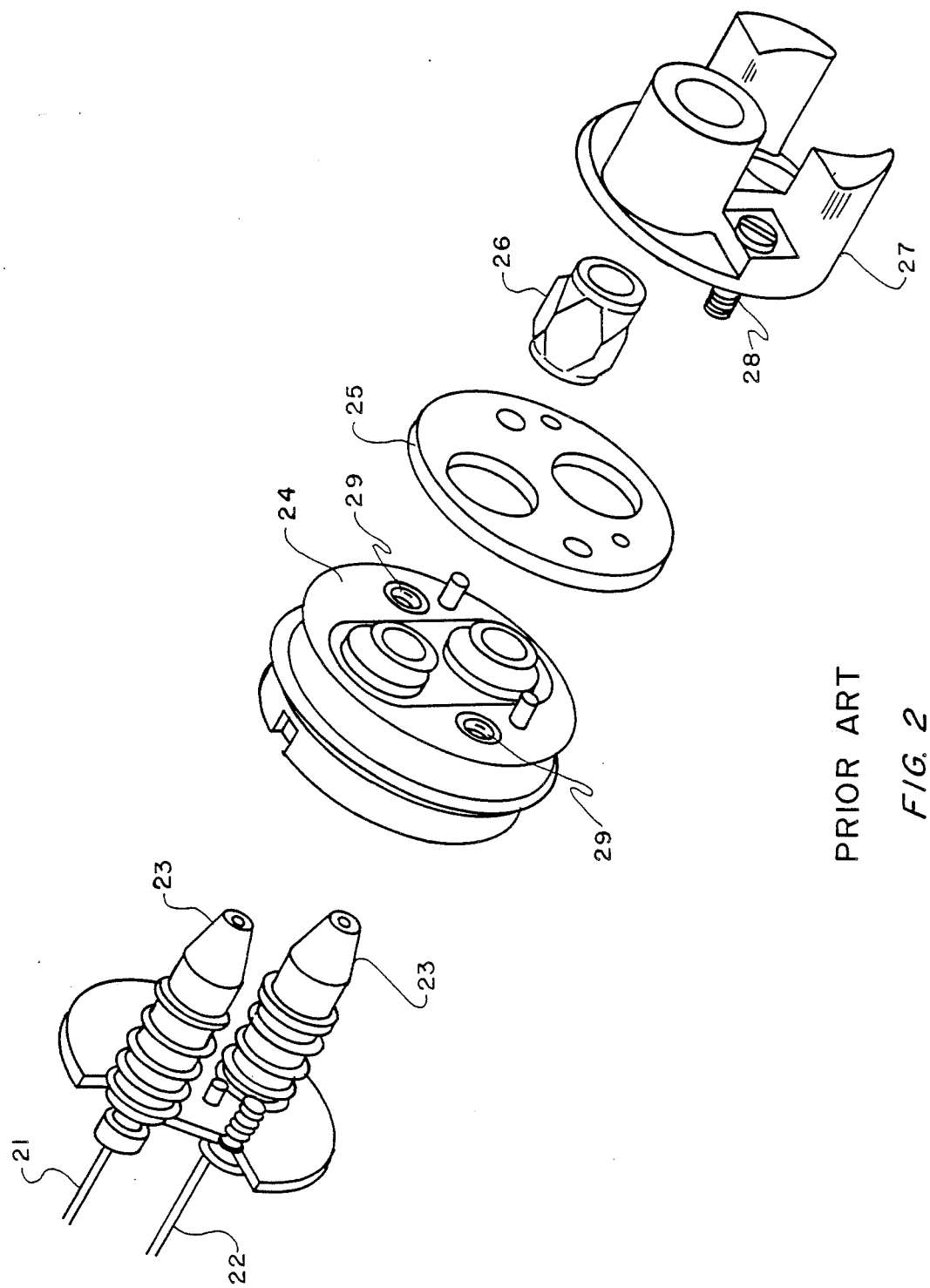
FIG. 2 is an exploded, perspective view of a prior art connector assembly.

Referring now to the drawings, FIG. 1 shows, in block form, electronic equipment 11 which is coupled by the fiber optic cables 12 to one or more remote areas. It is not uncommon for messages of various types and classifications to be carried over the fiber optic cables. For example, one cable (of several fibers) might carry regular telephone traffic, another cable may be dedicated to data (classified or unclassified), with the other cables being used for other and different messages of different levels of classification, such as unclassified, confidential, secret, etc. It is important, for security and other reasons, that any possible mixing or mixing-up of the traffic be avoided. Such a possibility clearly exists when prior art connector assemblies (such as shown in FIG. 2) are utilized. For example, it has been found in practice that a cable or cables having FIG. 2 type connector assemblies can be coupled or connected to the wrong bulkhead connector assembly(s). To avoid this problem, connector assemblies produced by Hughes Aircraft Co. and others are color coded. However, color coding is no solution when the cable-to-equipment connections must be made in the dark.

FIG. 2 shows, in part, a state-of-the-art connector assembly made by ATT Technologies, Inc. (formerly Western Electric). The connector assembly of FIG. 2 is mounted on each end of a fiber optic cable comprised of two optical fibers - which can be single-mode or multi-mode. The connector assembly of FIG. 2 is hermaphroditic and couples to a similar (bulkhead) connector assembly mounted on a piece of electronic equipment. The connector assembly shown in FIG. 2 comprises a pair of optical fibers 21 and 22 which terminate in a pair of biconic plugs or ferrules 23. The plugs 23 pass through holes in the mounting plate 24 and the seal retainer 25. One biconic plug 23 is inserted into the biconic sleeve 26 (note, another biconic sleeve is contained in the other, mating, connector assembly, not shown). The connector assembly is terminated by the sleeve retainer or connector end plug 27. A pair of screws 28 are received in screw holes 29 in mounting plate 24 and serve to secure the several components together. The connector assembly components shown in FIG. 2 are disposed inside a cylindrical metallic shell (not shown). Other components not shown are a bend limiter, whose purpose is self-descriptive, a cap or cover for the connector assembly for use when the latter is not coupled to the bulkhead of electronic equipment, coupling rings for the connector assembly and its cover, the rings being threaded to permit the assembly and cover to be screwed together, etc. The cover contains a connector end plug that is identical to and therefore mates with the end plug 27. Since the prior art connector assembly of FIG. 2 is made and sold by ATT Technologies and has been shown and described herein only for comparative purposes, further detailed description of the same would not appear to be warranted.

As previously indicated, the hermaphrodite connector assembly of FIG. 2 is coupled to a similarly configured, bulkhead connector assembly. However, when the electronic equipment has multiple output ports, and multiple cables having the same (FIG. 2 type) connector assemblies are to be connected thereto, a misconnection and thus a mixing of traffic is a distinct possibility. It is the purpose of the present invention to prevent this possibility. To this end, and as will be more evident hereinafter, the connector end plug 27 of FIG. 2 can be uniquely configured (in numerous ways) in accordance with the principles of the present invention so that the connector matches and mates with one, and only one, similarly configured bulkhead connector. Furthermore, it will be evident that this approach is quite cost-effective, since only a keying insert end plug in accordance with the invention is substituted for the connector end plug 27. All of the other components of the connector assembly can be the same.

Figure 3:
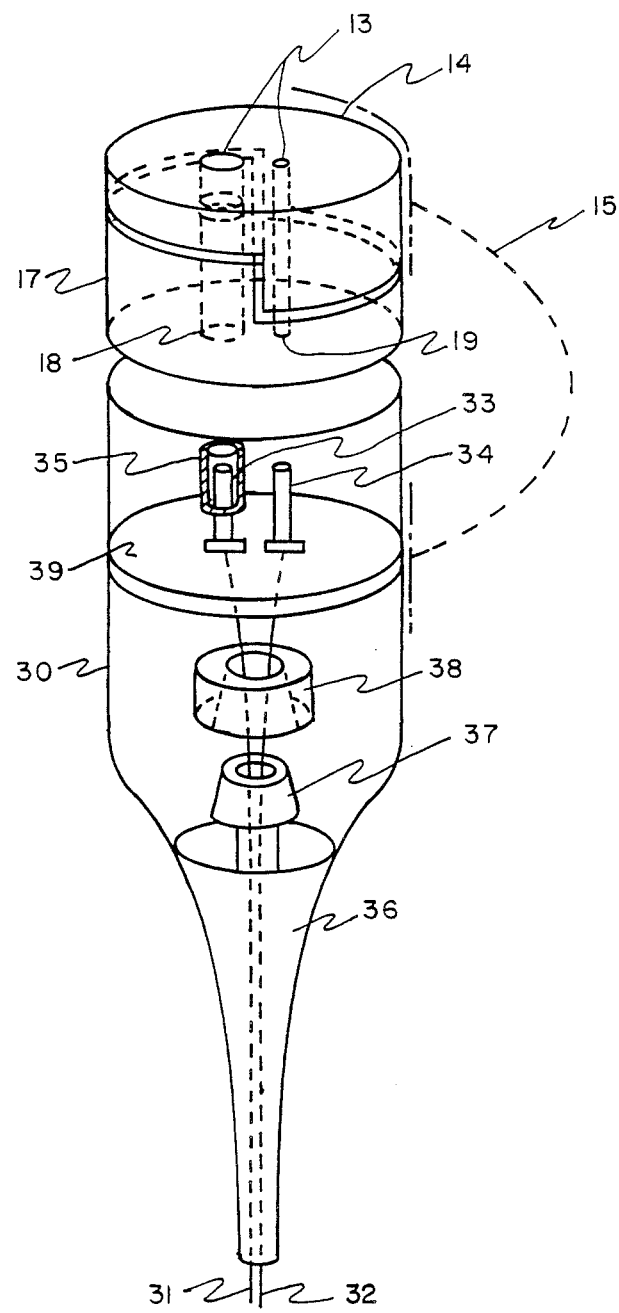
FIG. 3 is a view of another prior art connector assembly, modified by the inclusion of a keying insert end plug in accordance with the present invention.

FIG. 3 shows, in part, another connector assembly similar to that made and sold by Hughes Aircraft Co., but modified to include a keying insert end plug in accordance with the present invention. As will be more evident hereinafter, the keying insert of the invention precludes undesirable fiber optic connections-even in the dark. The connector assembly of FIG. 3 is mounted on each end of an optical fiber cable, it is hermaphroditic, and it couples to a similar (bulkhead) connector assembly mounted on a piece of electronic equipment. The connector of FIG. 3 comprises a pair of optic fibers 31 and 32 which terminate in a pair of ferrules 33 and 34.

A metallic, cylindrical sleeve 35 surrounds the end of ferrule 33, as shown in the figure, and is intended to receive a ferrule of the mating connector assembly. Likewise, the ferrule 34 is received in a similar sleeve in the mating connector. The fibers 31 and 32 pass through the bend limiter 36, the internal and external sleeves 37 and 38 of the strength member tie-off (or Kevlar tie-off), and the mounting plate 39 to which the ferrules are affixed. The cylindrical metallic shell 30 is disposed around the recited components. Since the above-noted components comprise standard parts of a commercially available connector assembly, further detailed description of the same would not appear to be necessary.

The connector assembly of FIG. 3 is terminated by a keying insert end pluq 17 constructed in accordance with the invention. The keying insert 17 is cylindrical and approximately three-quarters of an inch at its thickness, but this dimension is given only by way of example. A pair of screws (not shown) secure the insert end plug 17 to the mounting plate 39 in the manner previously described. The hole 18 (in dotted outline) in the keying insert receives the sleeve 35 and the hole 19 receives ferrule 34 when the keying insert is screwed to the mounting plate. The keying insert end plug 17 has (for each fiber optic cable) a unique end face configuration. In the example shown in FIG. 3, one-half of the cylindrical surface of the insert 17 is stepped-down or reduced in thickness by about half (the exact amount is not too significant). Thus, it will be evident that the connector assembly of FIG. 3 will couple or mate with, and only with, a bulkhead connector assembly that has the same, matching, end face configuration.

The insert cap or cover 14 has an end face configuration which is the same as that of the keying insert 17 and thus it readily mates therewith, as suggested in the drawing. The insert cover 14 is provided with a pair of holes 13 which are similar to and are aligned with the holes 18 and 19 when the cover is mounted on the connector assembly.

A pair of screws (not shown) secure the cover insert 14 to a mounting plate (not shown) in an outer cylindrical, metallic cover (also not shown). The outer metallic cover and the cylindrical shell 30 have coupling rings which are threaded to permit the cover to be screwed onto the connector assembly. With the cover screw-mounted in position, the end of the connector assembly is completely enclosed for protective purposes. Many prior art connector assemblies (e.g., the WECo. connector assembly of FIG. 2) have metallic outer covers and threaded coupling rings for coupling the covers onto the connector assemblies. For this reason and because these components of standard connector assemblies have little to do with the present invention, a detailed showing and discussion of the same would do little more than encumber the present invention disclosure.

Small "O" rings that serve as sealers (for moisture) are placed in the holes 18 and 19 or, alternatively, are placed around the sleeve 35 and ferrule 34. As suggested by the dotted line 15, a wire is attached to the outer end cover (not shown) and to the connector assembly so tha they are not (accidentally) separated.

Figure 4A:
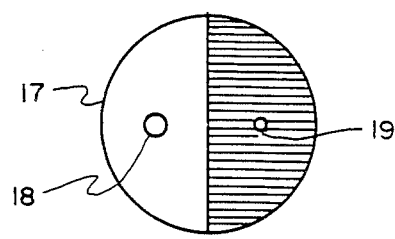
FIG. 4A and 4B are, respectively, an end view and an elevation view of the keying insert end plug of FIG. 3.
Figure 4B:
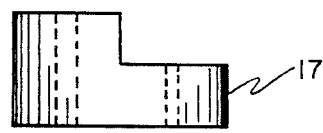

FIG. 4A shows an end view of the keying insert end plug 17 of FIG. 3, and FIG. 4B shows an elevation view of the same. The screws for securing the insert 17 to the mounting plate 39 are not shown. The keying insert 17 is made of a plastic material such as silica filled epoxy and it is formed by molding. FIGS. 4A and 4B are self-descriptive and further explanation is deemed unnecessary.

Figures 5A, 5B:
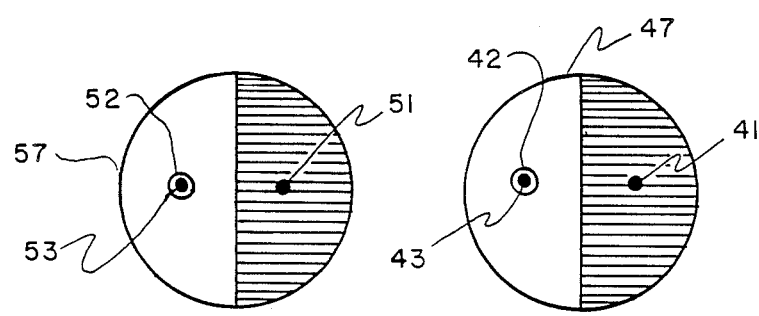
FIGS. 5A and 5B show in abbreviated form the end view of a fiber optic cable, connector assembly and the end view of the bulkhead connector assembly, respectively.

FIG. 5A shows in abbreviated form the end view of a fiber optic cable, connector assembly. The end face configuration of the connector keying insert 57 is the same as that shown in FIG. 4A. The shaded area is the recessed section of the keying insert. A ferrule 51 fills the hole in one side of the keying insert, and the sleeve 52 and other ferrule 53 are disposed in the hole in the other side of the keying insert. The bulkhead connector assembly is shown in abbreviated form in FIG. 5B and, as previously indicated, has a connector keying insert 47 the same as that shown in FIG. 5A. Reference numerals 41 and 43 designate the ferrules, and 42 is the sleeve in the bulkhead connector which surrounds ferrule 43. When the similarly configured end faces of keying inserts 47 and 57 are appropriately mated, or brought together, the ferrule 41 will be received in the sleeve 52 and the ferrule 51 will be received in the sleeve 42. The two connector assemblies are then screwed together, in the conventional manner and the opposed optical fibers are thus brought into abutment for optical transmission purposes.

FIG. 6 shows keying inserts 61 and 62 for the fiber optic cable connector assembly and the bulkhead connector assembly, respectively. The transition between the flat surfaces of the end face of insert 61 is at an angle (e.g., 45), in contrast to the 90 step-down in FIG. 4. The keying insert 62 for the bulkhead connector assembly has the same end face configuration and thus readily mates with the insert 61 of the cable connector assembly, as evidenced in FIG. 6.

FIG. 7 shows still another alternative end face configuration for the keying insert end plugs 71 and 72. The transition between the flat surfaces of the end face of keying insert 71 is a two-step one, instead of the single step transition of FIG. 4. The keying insert 72 for the bulkhead connector assembly has the same end face configuration and, therefore, readily mates with the keying insert 71 of the cable connector assembly - an illustrated in FIG. 7.

FIGS. 8A and 8B illustrate still another embodiment of matching, keying insert end plugs. The keying insert 81 for a cable connector assembly is similar to the keying insert 17 of FIG. 4, but in addition it comprises a channel 82 and a raised ridge 83. The channel and ridge extend for the full length of the step between the flat surfaces of the end face of insert 81. The matching keying insert 85 of the bulkhead connector assembly similarly comprises a channel 86 and a raised ridge 87, which extend for the full length of the step. When the end faces of inserts 81 and 85 are appropriately mated, or brought together, the ridge 83 will be received in the channel 86 and the ridge 87 will be disposed in channel 82.

From an examination of the different keying insert end plugs of FIG. 5-8 it is evident that each has a unique end face configuration. Accordingly, if each of the four fiber optic cables of FIG. 1 employ a different one of these four keying inserts in its end connector assemblies, a given cable can be connected to one, and only one, similarly configured bulkhead connector. More specifically, and merely by way of example, a cable connector assembly having a keying insert 61 (FIG. 6) can not be accidentally coupled to (i.e., mated with) a bulkhead connector assembly that employs a keying insert such as shown in FIGS. 5, 7 or 8.

Four unique, keying insert, end face configurations have been shown for use with the four (two-fiber) cables of FIG. 1. However, it should be readily evident that other and different, unique, end face configurations are possible and anyone with a modest amount of skill in the art can readily envision other acceptable, unique, end face configurations.

The insert caps or covers for the keying insert end plugs of FIG. 6-8 have not been shown. However, as will be evident from the foregoing disclosure, the cover insert for a connector assembly having a given keying insert end plug (e.g. 61, 71 or 81) must have an end face configuration which matches, and therefore mates with, that of the keying insert end plug. By way of example, the cover insert for a connector assembly terminated by means of the keying insert end plug 81 of FIG. 8A should have an end face configuration the same as that illustrated in FIG. 8B.

FIG. 9A shows in abbreviated form the end view of a cable connector. The end face configuration of the connector keying insert 91 is the same as that shown in FIG. 4A. The shaded area is the recessed section of the keying insert. However, in the case of FIG. 9A the connector terminates a four fiber cable. The reference numeral 92 designates ferrules and the reference numeral 93 designates the sleeves or holes which receive the ferrules 94 of the bulkhead connector shown in FIG. 9B. As before, the end face configurations shown in FIGS. 9A and 9B are complementary so that the cable and bulkhead connector assemblies mate precisely. The ferrules 92 of the cable connector are, of course, received in the sleeves or holes 95.

FIGS. 10A and 10B illustrate alternative keying inserts 101 and 102 for four-fiber cable connector and bulkhead connector assemblies, repectively. Once again, the shaded areas represent recessed sections. These keying inserts are readily molded in the configuration illustrated. FIGS. 10A-B are self-descriptive and further explanation seems unwarranted.

FIGS. 11A and 11B show still another embodiment of matching, keying insert end plugs. The keying inserts of FIGS. 11A-B are similar to the inserts of FIGS. 10A-B, but in addition they comprise channels 111 and 112 and raised ridges 113 and 114. The channels and ridges extend for the full length of the step between the flat surfaces of the inserts.

Three unique, keying insert, end face configurations have been shown in FIGS. 9-11. Other and different end face configurations should be readily apparent. For example, closely spaced pairs of ridges and channels could be used to achieve a unique end face configuration; the axial distance (from the-center) of the ridges and channels might be different from the axial distance(s) shown in FIG. 11, ridges and channels of unique and different shape from that shown in FIG. 11 can be molded, etc.

The end face configurations of the cover inserts to be used in conjunction with the connector end plugs shown in FIGS. 9-11 should be very apparent at this point and, therefore, a detailed description of the same would not seem to be necessary.

FIGS. 12A and 12B illustrate keying insert end plugs 121 and 122 for six-fiber cable connector and bulkhead connector assemblies, respectively, with the shaded areas representing recessed sections. FIGS. 12A and 12B are self-descriptive and further explanation at this point would seem neither necessary nor desirable.

FIGS. 13A and 13B show another embodiment of matching, keying insert end plugs for six-fiber cable-to-bulkhead connections. The keying inserts of FIGS. 13A-B are similar to the inserts of FIGS. 12A-B, but in addition they comprise channels 131 and raised ridges 132, which extend for the length of the step-down. When connected or inter-coupled the ridges are, of course, disposed in the channels.

While only two embodiments of the invention have been shown in FIGS. 12 and 13 for the six-fiber case, other and different embodiments should readily come to mind at this point in the disclosure. The end face configurations of the cover inserts to be used in conjunction with the connector end plugs shown in FIGS. 12–13 should also be quite evident at this point and the same does not warrant additional description. Furthermore, the principles of the invention can be readily extended to cable and bulkhead connectors for 8, 10, 12... fibers per cable.

The following procedure should be followed when connecting a plurality of cables to electronic equipment (e.g. cables 12 to apparatus 11 of FIG. 1). Since the connector covers are keyed in the same fashion as the connectors to be interconnected, it is dictated that the craftman first connect, or try to connect, a pair of covers that match and mate. Since the covers are merely dummies (i.e., no optical fibers) this can be done rather hurriedly and even roughly. When a match or cover-mating is obtained, and only then, the craftman can proceed to connect the (wire-attached) cable-to-bulkhead connector assemblies. Since a cover mating is first obtained, the craftman knows in advance that a given cable will mate with the exposed (i.e., cover-off) bulkhead connector. Knowing this, a greater degree of care can be exercised in mating the cable-to-bulkhead connector assemblies. And, as a consequence, possible damage to the fiber optic ends will be minimized.

The above-described embodiments are merely illustrative of the principles of the present invention and, as previously pointed out, numerous modifications and variations therein may be devised by those skilled in the art without departing from the spirit and scope of the invention.

What is claimed is:

1. In a system wherein electronic equipment is coupled to one or more remote locations via a plurality of fiber optic cables, said electronic equipment having a plurality of output ports to which said fiber optic cables are respectively connected, each fiber optic cable comprising at least two optical fibers and a separate and individual connector assembly at each end thereof, the connector assembly at each end of a given cable being characterized by an identical hermaphrodite connector having a keying insert end plug with an end face configuration that is unique to said given cable, said end face configuration having one or more sections which are axially recessed with respect to one or more other sections thereof.

2. In a system as defined in claim 1 wherein the connector assemblies of the plurality of fiber optic cables each comprise a hermaphrodite connector having a unique keying insert end plug which is of a different end face configuration from those of the connector assemblies of the other fiber optic cables, each keying insert end face configuration having one or more sections thereof axially offset a predetermined amount with respect to the other section or sections.

3. In a system as defined in claim 2 wherein each of said plurality of output ports of said electronic equipment comprises a bulkhead connector assembly, each bulkhead connector assembly being characterized by a hermaphrodite connector having a keying insert end plug with an end face configuration that is unique to a given output port.

4. In a system as defined in claim 3 wherein each bulkhead assembly keying insert end plug is of a different end face configuration from those of the other bulkhead assembly keying insert end plugs, each bulkhead keying insert end face configuration having one or more sections thereof axially offset a predetermined amount with respect to the other section or sections.

5. In a system as defined in claim 4 wherein a given bulkhead connector assembly has a keying insert end plug which is the same as the keying insert end plug of a selected cable connector assembly.

6. In a system as defined in claim 5 wherein each bulkhead connector assembly has a unique keying insert end plug which is identical to that of a respective cable of said plurality of cables so that each bulkhead connector assembly matches and mates with one, and only one, fiber optic cable, connector assembly.

7. In a system as defined in claim 6 including a connector cover for each cable and bulkhead connector assembly, each cover having a keying insert with a unique end face configuration which is identical to, and mates with that of the keying insert of the connector assembly it is intended to cover.

8. In a system as defined in claim 7 including means for attaching each connector cover to its connector assembly to prevent an accidental separation therefrom.

9. In a system as defined in claim 6 wherein the cable and bulkhead connector assemblies provide for two-fiber intercoupling.

10. In a system as defined in claim 6 wherein the cable and bulkhead connector assemblies are adapted to provide four-fiber optical intercoupling.

11. In a system as defined in claim 6 wherein the cable and bulkhead connector assemblies are adapted to provide at least six-fiber optical intercoupling.

12. In combination, equipment means providing electronic messages of various predetermined types and classifications, a plurality of fiber optic cables for carrying respective messages between said equipment means and one or more remote locations, said equipment means having a plurality of output ports to which said fiber optic cables are respectively connected, each fiber optic cable having at least two optical fibers and a separate and individual connector assembly at each end thereof, each connector assembly of a given cable having the very same keying insert end plug with an end face configuration that is unique to said given cable, said end face configuration having one or more sections that are axially recessed with respect to one or more other sections thereof, the plurality of cables having unique keying insert end plugs in their respective connector assemblies different from those of the other connector assemblies, each of said plurality of output ports having a bulkhead connector assembly with a keying insert end plug of end face configuration that is unique to a given output port, each bulkhead assembly keying insert being of a different end face configuration from those of the other bulkhead assembly keying inserts, each bulkhead connector assembly having a keying insert which is identical to the keying insert of a selected cable so that each bulkhead connector assembly matches and mates with one, and only one, cable connector assembly.

* * * * *